No. 720,000. PATENTED FEB. 10, 1903.
A. S. COMSTOCK.
PRESSURE CONTROLLING VALVE.
APPLICATION FILED NOV. 29, 1901.
NO MODEL. 2 SHEETS—SHEET 1.
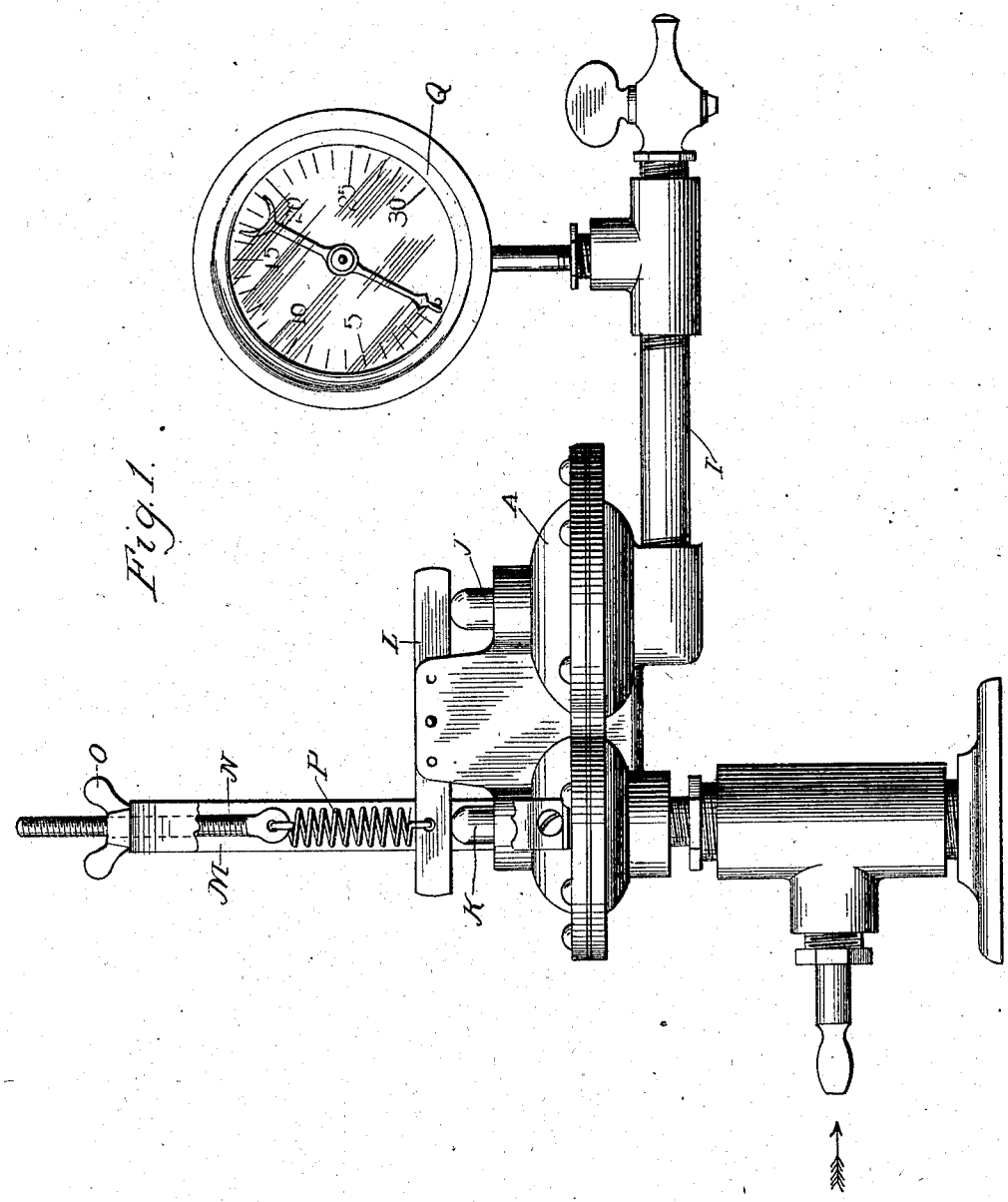

No. 720,000. PATENTED FEB. 10, 1903.
A. S. COMSTOCK.
PRESSURE CONTROLLING VALVE.
APPLICATION FILED NOV. 29, 1901.
NO MODEL. 2 SHEETS—SHEET 2.
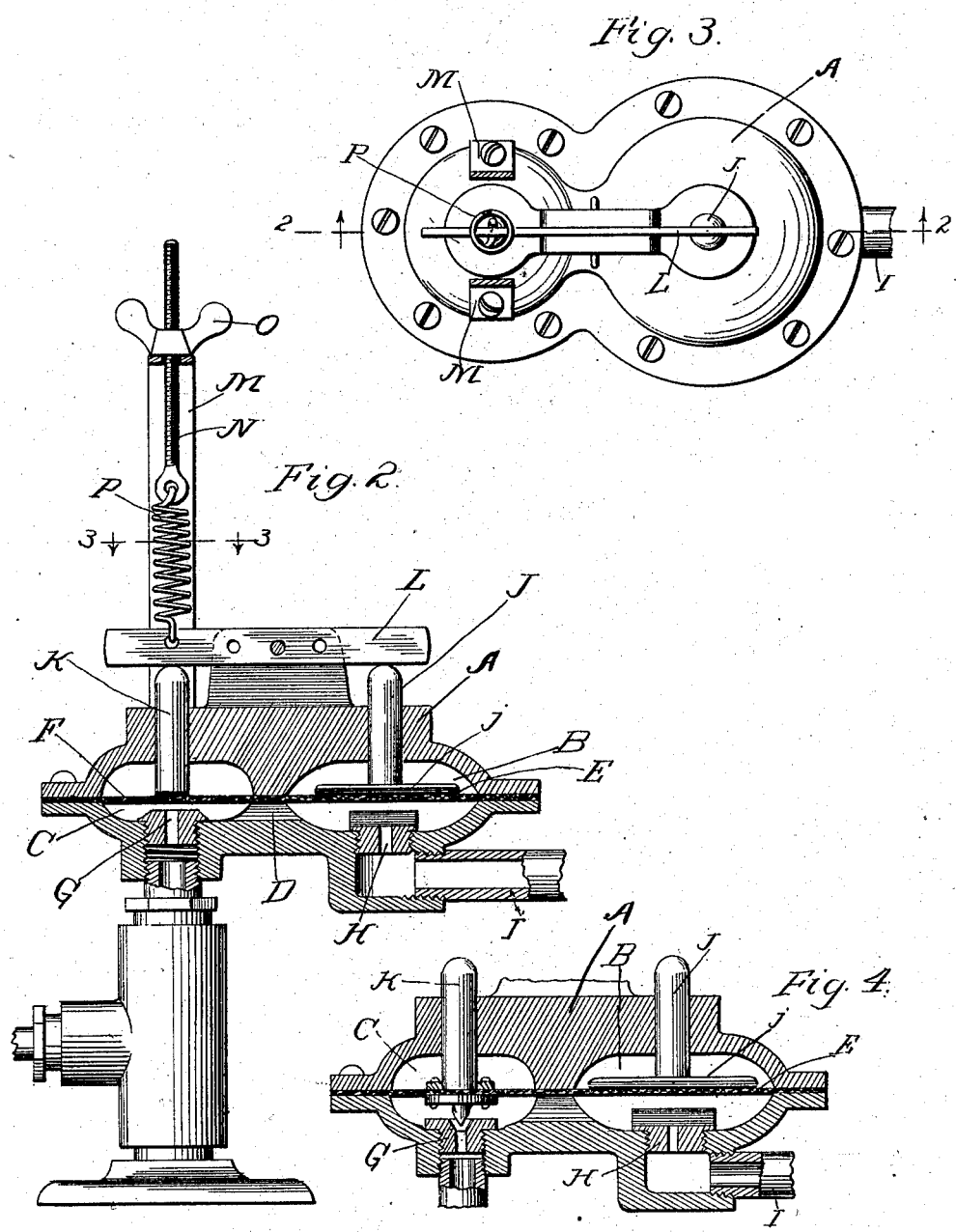

UNITED STATES PATENT OFFICE.

ALPHONSO S. COMSTOCK, OF EVANSTON, ILLINOIS.

PRESSURE-CONTROLLING VALVE.

SPECIFICATION forming part of Letters Patent No. 720,000, dated February 10, 1903.

Application filed November 29, 1901. Serial No. 84,060. (No model.)

*To all whom it may concern:*

Be it known that I, ALPHONSO S. COMSTOCK, a citizen of the United States, residing at Evanston, in the county of Cook and State of Illinois, have invented certain new and useful Improvements in Pressure-Controlling Valves, of which the following is a specification.

An object of my invention is to produce a pressure-controlling device which when set at any given pressure will allow the steady outflow therefrom of a current under the pressure for which the valve has been set and will at the same time automatically adjust itself to any variations in the pressure of the inflowing current without materially varying the steady flow of the outflowing current at the desired pressure.

A further object of my device is to produce a reducing-valve which while positive and reliable in action and having a wide range of adjustment shall at the same time comprise a few parts of simple construction, easily accessible, which shall not readily get out of order, and which shall be durable and yet inexpensive.

These and such other objects as may hereinafter appear are attained by the devices illustrated in the accompanying drawings, in which—

Figure 1 is a side elevation of the preferred form of my device. Fig. 2 is a vertical section through the pressure-chambers. Fig. 3 is a plan view thereof, and Fig. 4 is a longitudinal vertical section through a modified form of my device.

The fundamental principle of my invention consists in utilizing a pressure-exposed diaphragm to control the closing of a valve through which the higher pressure enters the diaphragm-chamber or a chamber in communication therewith and to yieldingly oppose the valve-closing action of said diaphragm by means whereby the diaphragm will operate to close said inlet-valve only when the pressure within the diaphragm-chamber exceeds a given pressure, which is determined by said yielding means, and all so arranged that the action of the diaphragm will tend to reduce the opening between said inlet-valve and its valve-seat, so as to automatically admit the entrance through said opening of a just sufficient flow of a current under the high pressure to maintain an outflow at the desired lower pressure rather than to wholly shut off such inflow.

In the preferred form of my device A is a casing containing a diaphragm-chamber B and a valve-chamber C. The diaphragm-chamber B is partitioned into non-communicating sections by the diaphragm E. The valve-chamber C is similarly partitioned by a diaphragm F.

G is an inflow-valve opening into one side of the diaphragm-chamber C and supplying thereto a current of fluid under high pressure. The pressure side of the valve-chamber C communicates freely with one side of the diaphragm-chamber B through a passageway D. Leading from the pressure side of the chamber B is an outlet-port H, through which a current at a reduced pressure is supplied through the pipe I to any desired point.

J is a stem arranged to be reciprocated freely through the casing A and provided with a button *j*, which rests upon the diaphragm E. K is a similar stem, which rests upon the diaphragm F directly above the inlet-port of the valve G.

L is a lever having its opposite ends resting upon the stems J K, respectively, and pivoted at a point between said stems.

M is a yoke, through which passes an adjusting-screw N, which is supported by a thumb-screw O.

P is a tension-spring attached at one end to the adjusting-screw N and at its other end to the lever L in such a manner as to oppose the upward movement of the stem J.

I prefer to have the diaphragm F of smaller area than the diaphragm E.

With the device assembled and in its normal position the diaphragms E F extend horizontally across the diaphragm-chambers B C, respectively, and the inlet G and the outlet-port H are open for the free passage of a current therethrough. Assuming now that a current exceeding atmospheric pressure is admitted through the valve G, it is obvious that as soon as the passage D shall permit an equalization of pressure in the pressure sides of the chambers B C the pressure against the greater area of the diaphragm E will overcome the pressure against the under side of the diaphragm F, with the result that the stem J will be moved upwardly, correspondingly lifting the end of the lever L in contact therewith and depressing the opposite end thereof, whereby the stem K will be forced downwardly against the diaphragm C upon the valve G and close the same, thereby shutting off the inflow of the current under pressure. If, however, by tightening the thumb-screw O the spring P is put under a tension equivalent to the reduced pressure which it is sought to maintain at the outlet-port H, it is obvious that the valve G will remain open until the pressure against the under side of the diaphragm E not only overbalances the pressure against the under side of the diaphragm F, but also overcomes or exceeds the tension upon the spring P. When this point is reached, the diaphragm E will start to lift the valve J and the corresponding end of the lever L, thereby depressing the opposite end of the lever and forcing the stem K downwardly against the diaphragm E in a manner tending to close the valve G, as before. This action, however, immediately places the spring P under a greater tension, which tension increases the farther the stem J is moved upwardly. Simultaneously with the increasing of the tension of the spring P, which tends to retard the upward movement of the stem J, the downward movement of the stem K has resulted in choking the area of the outlet between the diaphragm E and the valve G, thereby resulting in a constantly-increasing reduction in the pressure within the chambers B C, there being a free outlet through the port H, and consequently a point of equilibrium is soon reached at which the diaphragm F is held in such proximity to the valve G as to permit the passage between said diaphragm and said valve of only a sufficient flow of current under a high pressure to maintain a steady outflow through the port H of a current at the desired lower pressure. Whenever the pressure against the diaphragm F is lessened, the tension of the spring P releases the stem K sufficiently to allow of an increase in the inflow through the valve G, while any increase in pressure against the diaphragm F will result in a further depression of the stem K and a consequent lessening of the inlet-passage between diaphragm F and valve G. Should the use of the outflowing current be stopped and the outflow through the port H and pipe I be shut off, the apparatus will automatically shut off the inflow through the valve G as soon as the pressure within the chamber B shall exceed the point fixed by the tension upon the spring P.

As shown in Fig. 1, the pipe I may be provided with a pressure-gage Q, and by adjusting the thumb-screw O and watching the gage Q the device may be set to secure any desired outflowing pressure less than the pressure of the inflowing current through the valve G. Should the pressure-gage show a pressure in excess of that desired, a gradual lessening of the tension upon the spring P will result in a corresponding reduction of the pressure indicated by the pressure-gage, so that when the adjustment of the tension of the spring P is accompanied by the indication on the pressure-gage of the pressure which it is desired to maintain at the outlet H the device will thereafter automatically adjust itself to maintain such outflowing pressure at all times, regardless of any variations in the inflowing pressure, so long as the inflowing pressure shall exceed the pressure which it is desired to maintain at the outlet.

Although I have shown my device arranged as a pressure-reducing valve, it is evident that, broadly speaking, it is a device whereby the pressure within the pressure-chamber, and so, of course, within any chamber in free communication therewith, may be automatically maintained at a desired point. So, of course, my advice is adaptable for use in all locations where such conditions exist, and I do not wish to be considered as limiting myself to a pressure-reducing valve.

While I have preferred to use a spring for yieldingly opposing shutting off the supply of fluid under pressure, it is evident from the foregoing description that any means which will oppose this shutting off with a tension which increases as the parts move in a direction to shut off the supply will come within the spirit of my invention. The spring need not necessarily be adjusted; but as the spring or its equivalent is merely necessary to furnish this increasing resistance the adjustment of the spring may be constant, while the pressure to be overcome by the actuating-diaphragm may be adjusted at will independent of the spring in any suitable manner, as by shifting the fulcrum of the lever, as shown in Fig. 1, or in any other suitable way which may suggest itself; but all such adaptations of my device come within the spirit of my invention and are contemplated hereby.

It will be observed that in my preferred construction I provide the stems J with a large button, which rests upon the diaphragm F. When so constructed, the surface of the bottom of this button offers such a large area to fluid-pressure within the pressure-chamber that it may be relied upon for the operation of the device regardless of the fit of the diaphragm. When so constructed, the diaphragm serves merely to support the stem J when there is no pressure on the apparatus and to partition the diaphragm-chamber, so as to provide a pressure-chamber below the button. It has been found in devices of this sort that after having been used there is a tendency of the diaphragm to stretch, thereby allowing it to bulge around the stem resting thereon under pressure without necessarily lifting the stem. Under these circumstances the area of the lower end of the stem must be relied upon to furnish the desired lifting area.

In Fig. 4 I have shown a modified form of my device, in which the diaphragm within the chamber C does not itself constitute the valve for closing the port G, but has a valve clamped to it and arranged to be seated in the port G when said diaphragm is forced downwardly by a downward movement of the stem K, resulting from an upward movement of the stem J on account of an excess of pressure against the under side of the diaphragm E.

Having thus described my invention, what I claim, and desire to secure by Letters Patent, is—

1. In a pressure-controlling device, the combination with a pressure-chamber, of a valve for controlling the supply of fluid under pressure to said chamber, means actuated by pressure within said chamber for operating said valve, and means for yieldingly opposing the movement of said valve in a direction to decrease said supply, said means comprising a lever, a yoke mounted above said lever, a spring attached to said lever, and a spring-adjusting device supported by said yoke and connected to said spring, substantially as described.

2. A pressure-regulating valve comprising a pressure-chamber, a valve for controlling the admission of fluid-pressure to said chamber, a pressure-actuated diaphragm mounted within said chamber, a stem arranged to be operated by the movement of said diaphragm under pressure, a lever arranged to be actuated by such movement of said stem in a direction to close said valve, a spring connected with said lever, means for adjusting said spring to oppose the movement of said lever in a direction to close said valve, and a support for said spring-adjusting means, substantially as described.

ALPHONSO S. COMSTOCK.

Witnesses:
 M. E. SHIELDS,
 F. H. DRURY.